US010318648B2

(12) United States Patent
Diaconu et al.

(10) Patent No.: US 10,318,648 B2
(45) Date of Patent: *Jun. 11, 2019

(54) MAIN-MEMORY DATABASE CHECKPOINTING

(71) Applicant: Microsoft Technology Licensing, LLC, Redmond, WA (US)

(72) Inventors: Cristian C. Diaconu, Kirkland, WA (US); Ryan L. Stonecipher, Carnation, WA (US); Michael James Zwilling, Bellevue, WA (US); Marcel Van Der Holst, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 527 days.

This patent is subject to a terminal disclaimer.

(21) Appl. No.: 14/953,291

(22) Filed: Nov. 27, 2015

(65) Prior Publication Data

US 2016/0078044 A1  Mar. 17, 2016

Related U.S. Application Data

(63) Continuation of application No. 13/719,248, filed on Dec. 19, 2012, now Pat. No. 9,304,998.

(51) Int. Cl.
*G06F 17/30* (2006.01)
(52) U.S. Cl.
CPC .. *G06F 17/30088* (2013.01); *G06F 17/30309* (2013.01); *G06F 17/30353* (2013.01); *G06F 17/3023* (2013.01)
(58) Field of Classification Search
CPC ............. G06F 17/30309; G06F 17/30088
(Continued)

(56) References Cited

U.S. PATENT DOCUMENTS 5,440,727 A * 8/1995 Bhide ............... G06F 17/30578
707/999.01
5,933,593 A * 8/1999 Arun .................. G06F 11/1451
711/126
(Continued)

FOREIGN PATENT DOCUMENTS

WO   2008061254 A1   5/2008

OTHER PUBLICATIONS

"Non Final Office Action Issued in U.S. Appl. No. 13/719,248", dated Mar. 17, 2015, 24 Pages.
(Continued)

*Primary Examiner* — Pierre M Vital
*Assistant Examiner* — Nargis Sultana
(74) *Attorney, Agent, or Firm* — Ray Quinney & Nebeker, P.C.; Thomas M. Hardman; Timothy Churna

(57) ABSTRACT

The present invention extends to methods, systems, and computer program products for main-memory database checkpointing. Embodiments of the invention use a transaction log as an interface between online threads and a checkpoint subsystem. Using the transaction log as an interface reduces synchronization overhead between threads and the checkpoint subsystem. Transactions can be assigned to files and storage space can be reserved in a lock free manner to reduce overhead of checkpointing online transactions. Meta-data independent data files and delta files can be collapsed and merged to reduce storage overhead. Checkpoints can be updated incrementally such that changes made since the last checkpoint (and not all data) are flushed to disk. Checkpoint I/O is sequential, helping ensure higher performance of physical I/O layers. During recovery checkpoint files can be loaded into memory in parallel for multiple devices.

20 Claims, 9 Drawing Sheets

(58) Field of Classification Search
USPC .......................................................... 707/649
See application file for complete search history.

(56) References Cited

U.S. PATENT DOCUMENTS

| | | | | |
|---|---|---|---|---|
| 5,996,088 | A * | 11/1999 | Frank | G06F 11/1451 714/6.12 |
| 6,052,799 | A * | 4/2000 | Li | G06F 11/1435 711/114 |
| 6,125,371 | A * | 9/2000 | Bohannon | G06F 17/30309 707/695 |
| 6,513,050 | B1 * | 1/2003 | Williams | G06F 11/1451 |
| 7,031,986 | B2 * | 4/2006 | Ito | G06F 17/30289 707/649 |
| 7,065,537 | B2 | 6/2006 | Cha et al. | |
| 7,305,421 | B2 | 12/2007 | Cha et al. | |
| 7,519,870 | B1 * | 4/2009 | Sim-Tang | G06F 11/1471 714/48 |
| 7,587,429 | B2 | 9/2009 | Liedes et al. | |
| 7,991,744 | B2 * | 8/2011 | Saha | G06F 17/30 707/648 |
| 8,661,213 | B2 * | 2/2014 | Scales | G06F 9/45558 707/639 |
| 8,826,273 | B1 * | 9/2014 | Chen | G06F 9/45558 718/1 |
| 2001/0042224 | A1 * | 11/2001 | Stanfill | G06F 11/1458 714/16 |
| 2002/0116404 | A1 * | 8/2002 | Cha | G06F 11/1471 |
| 2003/0061537 | A1 * | 3/2003 | Cha | G06F 11/1471 714/16 |
| 2005/0155031 | A1 * | 7/2005 | Wang | G06F 8/65 717/170 |
| 2005/0235016 | A1 * | 10/2005 | Amano | G06F 11/1435 |
| 2006/0004860 | A1 * | 1/2006 | Liedes | G06F 11/1471 |
| 2006/0101083 | A1 * | 5/2006 | Cherkauer | G06F 17/30312 |
| 2006/0161530 | A1 * | 7/2006 | Biswal | G06F 17/30356 |
| 2006/0167960 | A1 * | 7/2006 | Lomet | G06F 17/30353 |
| 2006/0184587 | A1 * | 8/2006 | Federwisch | G06F 11/1451 |
| 2007/0094312 | A1 * | 4/2007 | Sim-Tang | G06F 17/30085 |
| 2008/0195677 | A1 * | 8/2008 | Sudhakar | G06F 17/3023 |
| 2008/0256138 | A1 * | 10/2008 | Sim-Tang | G06F 11/1435 |
| 2008/0288556 | A1 * | 11/2008 | O'Krafka | G06F 11/1482 |
| 2009/0182785 | A1 * | 7/2009 | Aston | G06F 11/1448 |
| 2009/0307277 | A1 * | 12/2009 | Grubov | G06F 11/1451 |
| 2009/0327628 | A1 * | 12/2009 | Narayanan | G06F 11/1451 711/162 |
| 2010/0198788 | A1 * | 8/2010 | Sim-Tang | G06F 11/2082 707/634 |
| 2011/0029490 | A1 * | 2/2011 | Agarwal | G06F 9/467 707/684 |
| 2011/0082835 | A1 * | 4/2011 | Agrawal | G06F 17/30194 707/646 |
| 2011/0252000 | A1 * | 10/2011 | Diaconu | G06F 17/30501 707/638 |
| 2012/0005168 | A1 * | 1/2012 | Lomet | G06F 11/1471 707/683 |
| 2012/0136901 | A1 * | 5/2012 | Raatikka | G06F 17/30312 707/797 |
| 2012/0259816 | A1 * | 10/2012 | Cargille | G06F 11/1435 707/649 |
| 2013/0179401 | A1 * | 7/2013 | Lu | G06F 17/30353 707/634 |
| 2015/0058295 | A1 * | 2/2015 | Veeraraghavan | G06F 11/1451 707/649 |

OTHER PUBLICATIONS

"Notice of Allowance Issued in U.S. Appl. No. 13/719,248", dated Aug. 28, 2015, 10 Pages.

Liedes, et al., "Siren: A Memory-Conserving, Snapshot-Consistent Checkpoint Algorithm for In-Memory Databases", In Proceedings of the 22nd International Conference on Data Engineering (ICDE'06), Apr. 3, 2006, 12 Pages.

Saxena, et al., "Hathi: Durable Transactions for Memory using Flash", In Proceedings of the Eighth International Workshop on Data Management on New Hardware, DaMoN '12, May 21, 2012, 6 Pages.

"International Preliminary Report on Patentability Issued in PCT Application No. PCT/US2013/076716", dated Mar. 16, 2015, 10 Pages.

"International Search Report and Written Opinion Issued in PCT Application No. PCTUS2013076716", dated Jul. 22, 2014, 10 Pages.

"Second Written Opinion Issued in PCT Application No. PCT/US2013/076716", dated Dec. 18, 2014, 9 Pages.

* cited by examiner

MAIN-MEMORY DATABASE CHECKPOINTING

CROSS-REFERENCE TO RELATED APPLICATIONS

This application is a continuation of and claims the benefit of and priority to U.S. patent application Ser. No. 13/719,248, entitled "Main-Memory Database Checkpointing", filed Dec. 19, 2012 by Cristian C. Diaconu et al., the entire contents of which are expressly incorporated by reference.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, database management, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Relational databases can be used to store virtually any type of data. A relational database is a collection of data items organized as a set of formally described tables from which data can be accessed easily. Many relational database systems use disk storage mechanisms for storing data. Other relational databases, sometimes referred to as main-memory databases, store data in Random Access Memory (RAM).

Main-memory databases have a number of performance advantages over databases stored on disk. Main-memory databases are faster than disk-optimized databases since the internal optimization algorithms are typically simpler and execute fewer CPU instructions. Accessing data in memory also reduces the I/O reading activity when querying the data, which provides faster and more predictable performance than disk.

However, when data is stored in RAM, a system reset or loss or power can cause data to be lost. Thus it can be more difficult to support the durability portion of the ACID (atomicity, consistency, isolation, durability) properties when using a main-memory database. Various different mechanisms can be used to add durability to a main-memory database.

Some main-memory databases use snapshot files or checkpoint images, which record the state of a database at a given moment in time. Snapshots can be generated periodically, or, at least when the main-memory database does a controlled shut-down. Snapshots give a measure of persistence to the data (in that not everything is lost in the case of a system crash). However, snapshots only offer partial durability, as 'recent' changes will still be lost.

Thus, for full durability, they snapshots can be supplemented by with further mechanisms, such as, for example, transactional logging, the user of non-volatile RAM (NVRAM), or high availability implementations. Transactional logging records changes to the database in a journal file and facilitates automatic recovery of an in-memory database. NVRAM is typically in form of static RAM backed up with battery power (battery RAM), or an electrically erasable programmable ROM (EEPROM). With this storage, a main-memory database system can recover the data store from its last consistent state upon reboot. High availability implementations typically rely on database replication with automatic failover to an identical standby database. To protect against loss of data in the case of a complete system crash, replication of a main-memory database can be used in conjunction with one or more of the listed mechanisms.

Although snapshots can help insure durability, snapshot schemes typically suffer from a number of inefficiencies. Typical snapshot schemes use locking mechanisms to assign transactions to files and reserve storage space. The use or locking mechanisms increases processing overhead making snapshot creation less efficient. Many snapshot schemes also refer to external data to determine when and how snapshots can be reduced or merged with one another. Referring to external data for snapshot reduction and merging also increases processing overhead. Further, snapshot schemes also typically snapshot an entire database even if only a portion of a database has been changed since the last snapshot. This is an inefficient use of resources as large portions of database already included in a snapshot may be re-processed for inclusion in a new snapshot.

BRIEF SUMMARY

The present invention extends to methods, systems, and computer program products for main-memory database checkpointing. In some embodiments, a computer system updates a checkpoint for an in-memory database. The computer system maintains an in-memory database in system memory. A transaction is committed to the in-memory database. The results of the transaction modify the content of the in-memory database. The transaction has a timestamp indicating an associated time the transaction was committed relative to other transactions.

Checkpoint data is generated for the transaction from the results of the transaction. The checkpoint data includes versions of one or more inserted portions of data inserted into the in-memory database and includes identifiers for one or more deleted portions of data deleted from the in-memory database. The checkpoint data is appended to a checkpoint.

Appending the checkpoint data includes determining that the timestamp is within a specified timestamp range for a data file. The data file is configured to store any inserted portions of data inserted into the in-memory database within the specified timestamp range. The one or more inserted portions of data are appended to the data file.

For each of the one or more deleted portions of data, a corresponding insert operation that inserted the deleted portion of data into the in-memory database is identified. A timestamp is located for a transaction that included the corresponding insert operation. It is determined that the located timestamp is within a second specified time range for a delta file. The identifier for the deleted portion of data is appended to the delta file. The delta file is configured to store identifiers for any deleted portions of data deleted from the in-memory database during the second specified time range.

In other embodiments, a computer system manages the storage resources consumed by the checkpoint files. The computer system determines that the storage resources consumed by one or more data files and one or more matched delta files can be reduced. The determination is based on one or more of: the contents of the one or more data files and the one or more matched delta files and assigned timestamp ranges for the one or more data files and one or more matched delta files. Consumed storage resources for a data file are reduced by combining inserted portions of data contained in the data file with contents of at least one other checkpoint file.

Reducing consumed storage resources can include collapsing the contents of the data file. When collapsing the contents of a data file, the computer system locates identifiers for deleted portions of data in the matched delta file that correspond to inserted portions of data in the data file. When collapsing the contents of a file, the computer system also removes inserted portions of data corresponding to the located identifiers from the data file.

Reducing consumed storage resources can include merging the data file with another data file. When merging data files, the inserted portions of data in the data file are merged with inserted portions of data in the other data file. The assigned timestamp range for other data file being temporally adjacent to the assigned timestamp range for the data file within the temporal ordering.

In some embodiments, storage resources for a data files are reduced in response to satisfying a policy condition.

In further embodiments, a state of in-memory data that reflects a most recently committed transaction in a transaction log is restored. The location of each of each of one or more data files and each of one or more delta files is identified within durable storage. Each of the one or more data files is processed. Processing a data files includes locating identifiers for deleted portions of data in the matched delta file that correspond to inserted portions of data in the data file. Processing a data file also includes filtering the data file by skipping portions of inserted data corresponding to the located identifiers from the delta file. Filtering the data file leaves unfiltered portions of inserted data to be loaded into system memory. The unfiltered portions of inserted data are inserted into the in-memory database.

Subsequent to processing each of the one or more data files, the transaction log is replayed from a specified timestamp to the end of the transaction log. Replaying the transaction log realizes the effects of one or more additional transactions on the in-memory database. The one or more transactions not being included in a checkpoint.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
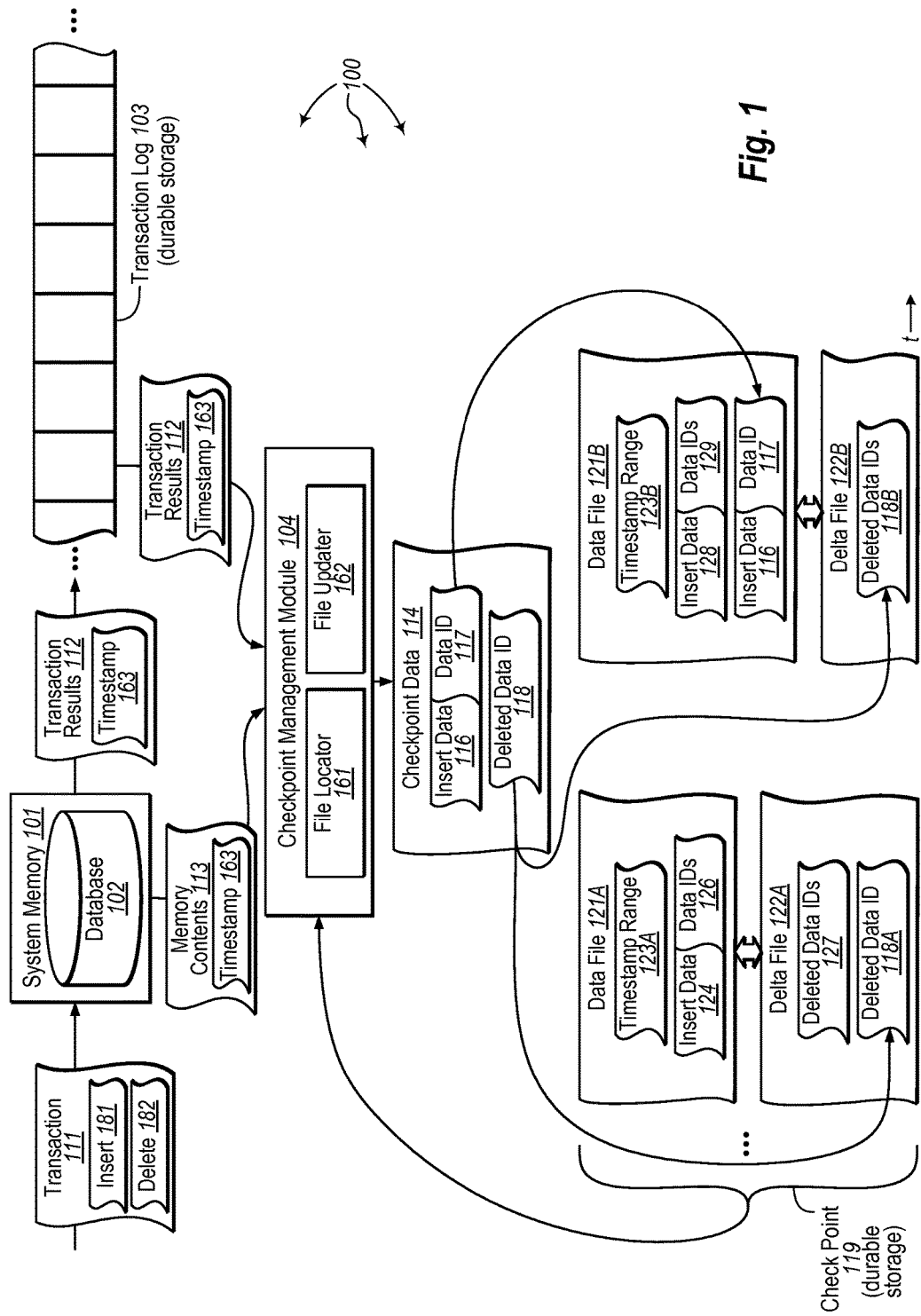
FIG. 1 illustrates an example computer architecture that facilitates updating a checkpoint for an in-memory database.

The present invention extends to methods, systems, and computer program products for main-memory database checkpointing. In some embodiments, a computer system updates a checkpoint for an in-memory database. The computer system maintains an in-memory database in system memory. A transaction is committed to the in-memory database. The results of the transaction modify the content of the in-memory database. The transaction has a timestamp indicating an associated time the transaction was committed relative to other transactions.

Checkpoint data is generated for the transaction from the results of the transaction. The checkpoint data includes versions of one or more inserted portions of data inserted into the in-memory database and includes identifiers for one or more deleted portions of data deleted from the in-memory database. The checkpoint data is appended to a checkpoint.

Appending the checkpoint data includes determining that the timestamp is within a specified timestamp range for a data file. The data file is configured to store any inserted portions of data inserted into the in-memory database within the specified timestamp range. The one or more inserted portions of data are appended to the data file.

For each of the one or more deleted portions of data, a corresponding insert operation that inserted the deleted portion of data into the in-memory database is identified. A timestamp is located for a transaction that included the corresponding insert operation. It is determined that the located timestamp is within a second specified time range for a delta file. The identifier for the deleted portion of data is appended to the delta file. The delta file is configured to store identifiers for any deleted portions of data deleted from the in-memory database during the second specified time range.

In other embodiments, a computer system manages the storage resources consumed by the checkpoint files. The computer system determines that the storage resources consumed by one or more data files and one or more matched delta files can be reduced. The determination is based on one or more of: the contents of the one or more data files and the one or more matched delta files and assigned timestamp ranges for the one or more data files and one or more matched delta files. Consumed storage resources for a data file are reduced by combining inserted portions of data contained in the data file with contents of at least one other checkpoint file.

Reducing consumed storage resources can include collapsing the contents of the data file. When collapsing the contents of a data file, the computer system locates identifiers for deleted portions of data in the matched delta file that correspond to inserted portions of data in the data file. When collapsing the contents of a file, the computer system also removes inserted portions of data corresponding to the located identifiers from the data file.

Reducing consumed storage resources can include merging the data file with another data file. When merging data files, the inserted portions of data in the data file are merged with inserted portions of data in the other data file. The assigned timestamp range for other data file being temporally adjacent to the assigned timestamp range for the data file within the temporal ordering. Reducing consumed storage resources also increases the efficiency of recovery procedures since there is less deleted data to scan and filter out when reloading system memory.

In some embodiments, storage resources for a data files are reduced in response to satisfying a policy condition.

In further embodiments, a state of in-memory data that reflects a most recently committed transaction in a transaction log is restored. The location of each of each of one or more data files and each of one or more delta files is identified within durable storage. Each of the one or more data files is processed. Processing a data files includes locating identifiers for deleted portions of data in the matched delta file that correspond to inserted portions of data in the data file. Processing a data file also includes filtering the data file by skipping portions of inserted data corresponding to the located identifiers from the delta file. Filtering the data file leaves unfiltered portions of inserted data to be loaded into system memory. The unfiltered portions of inserted data are inserted into the in-memory database.

Subsequent to processing each of the one or more data files, the transaction log is replayed from a specified timestamp to the end of the transaction log. Replaying the transaction log realizes the effects of one or more additional transactions on the in-memory database. The one or more transactions not being included in a checkpoint.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

Although described primarily with respect to in-memory databases, embodiments of the invention are applicable to versioned databases in general (whether data is stored in-memory or at other types or storage). Versioned databases are databases that create a new version of data to replace/update an expired version of data (e.g., rather than updating in place).

Embodiments of the invention use a transaction log as an interface between online threads and a checkpoint subsystem. Using the transaction log as an interface reduces synchronization overhead between threads and the checkpoint subsystem. Transactions can be assigned to files and storage space can be reserved in a lock free manner to reduce overhead of checkpointing online transactions. The schema of row data is not needed for checkpoint creation. As such, data files and delta files can be collapsed and merged to reduce storage overhead. Checkpoints can be updated incrementally such that changes made since the last checkpoint (and not all data) are flushed to disk. Checkpoint I/O is sequential helping ensure higher performance of physical I/O layers.

FIG. 1 illustrates an example computer architecture 100 that facilitates updating a checkpoint for an in-memory database. Referring to FIG. 1, computer architecture 100 includes system memory 101, transaction log 103, and checkpoint management module 104. System memory 101, transaction log 103, and checkpoint management module 104 can be connected to one another over (or be part of) a system bus and/or a network, such as, for example, a Local Area Network ("LAN"), a Wide Area Network ("WAN"), and even the Internet. Accordingly, system memory 101, transaction log 103, and checkpoint management module 104 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, system memory 101 includes in-memory database 102. In some embodiments, in-memory database 102 is a relational database. Transaction log 103 is configured to store log records indicating the effects of committed transactions inserting and deleting row versions for in-memory database 102. A log record can contain information about data (e.g., row versions) inserted and deleted by a transaction, sufficient to redo them. Transaction log 103 can be stored in durable storage. Thus, users or other computer systems can submit transactions on data (e.g., row versions) stored in database 102. The results of completed transactions can be then be logged in transaction log 103.

From time to time, at specified intervals, or in response to an express command or based on policy, checkpoint management module 104 can update a checkpoint for in-memory database 102. The checkpoint process can use streaming I/O and checkpoint I/O can occur incrementally as transactional activity accumulates. Checkpointing uses temporal locality to help ensure that data for transactions that have happened close to each other in time sequence have a high likelihood of being co-located.

A checkpoint is a set of checkpoint files. Three types of checkpoints files are data files, delta files, and directory files. A checkpoint can include a directory file and one or more data files and delta files. The location of a checkpoint directory file can be stored in durable storage so the location is available at recovery time.

A data file contains inserted data (e.g., row versions generated by inserts and updates) covering a specific timestamp range. Individual data files are logically characterized by the timestamp range they cover. Transactions that acquire an end-timestamp within that range are contained in the data file that covers the range. Thus, transactions data within data files has global ordering. That is, a data file is known to contain all the transactions between one point in time and another. A data file can be closed when transactions that have made space reservations in the data file have successfully serialized their content to the data file. Data files can be append only while opened and once closed are read-only. At recovery time the versions in data files are reloaded into memory and re-indexed, subject to filtering by delta files as discussed.

A delta file stores information about data (e.g., row versions) contained in a data file that were subsequently deleted. There can be a 1:1 correspondence between a delta file and a data file. Delta files are append-only for lifetime of the corresponding data file. At recovery time, a delta file can be used as a filter to avoid reloading deleted versions into memory.

A checkpoint file directory can be a file containing references to data files and delta files that make up a checkpoint. A checkpoint has a timestamp indicating the effects of transactions before the checkpoint timestamp are recorded in the checkpoint data and delta files and thus the transaction log is not necessary to recover them.

Thus, in general, checkpoint management module 104 can take a portion of a transaction log 103 not covered by a checkpoint and convert the log contents into one or more data files and one or more delta files. New data (e.g., row versions) can be appended to a most recent data file or to a newly created data file (e.g., when storage requirements dictate). IDs for deleted data (e.g., row versions) are appended to delta files corresponding to data files where the original inserted versions are stored.

When checkpoint management module 104 finishes processing the log portion, a checkpoint update can be completed by flushing all buffered writes to data and delta files. A new checkpoint file directory can be created that incorporates files from previous checkpoint and any newly added files. The location of the checkpoint directory file can then be stored in a durable location.

Figure 2:
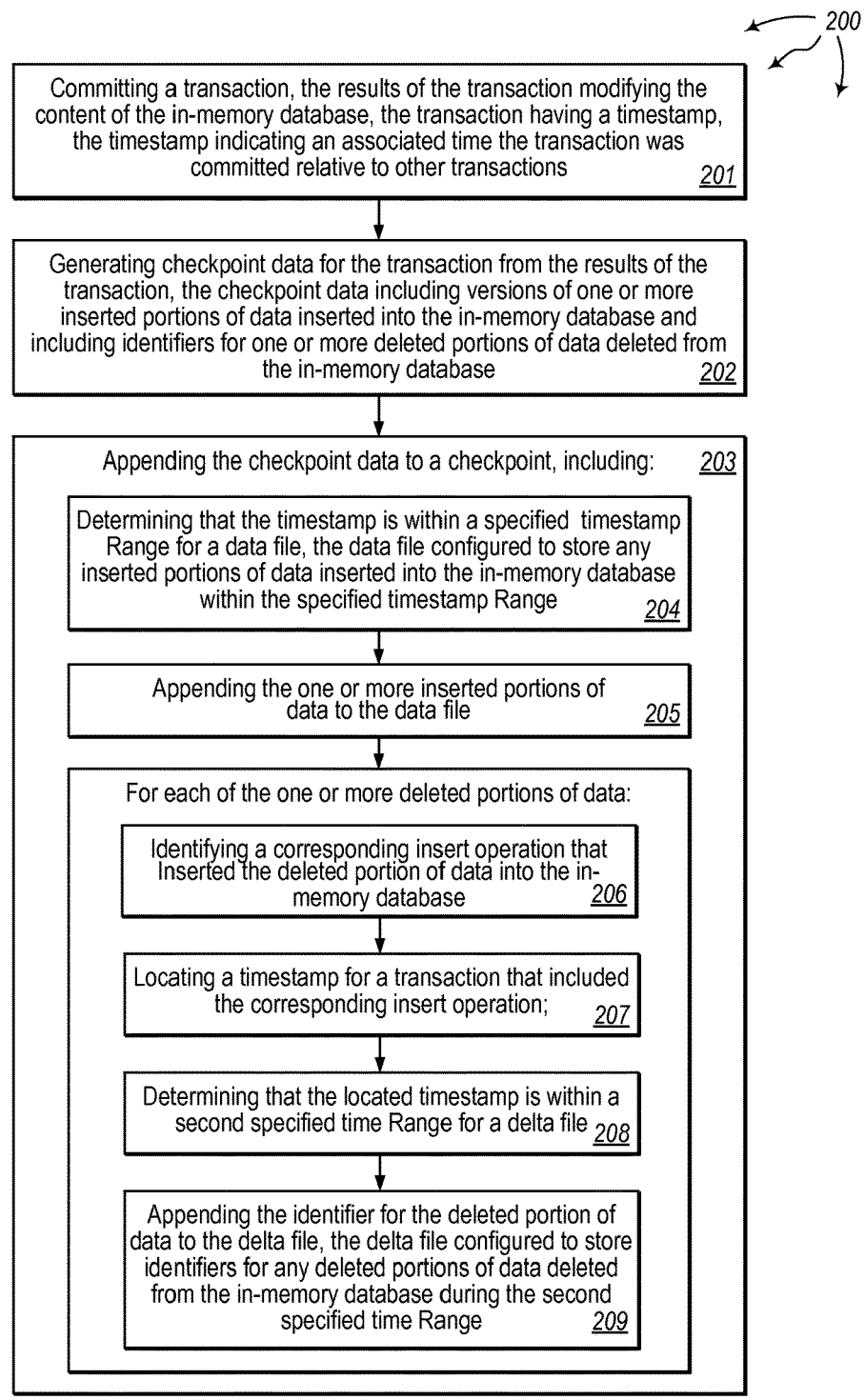
FIG. 2 illustrates a flow chart of an example method for updating a checkpoint for an in-memory database.

FIG. 2 illustrates a flow chart of an example method 200 for updating a checkpoint for an in-memory database. Method 200 will be described with respect to the components and data of computer architecture 100.

A user or computer system can submit transaction 111 to database 102. As depicted, transaction 111 includes insert operation 181 and deletion operation 182.

Method 200 includes committing a transaction, the results of the transaction modifying the content of the in-memory database, the transaction having a timestamp, the timestamp indicating an associated time the transaction was committed relative to other transactions (201). For example, transaction 111 can be committed. The results of transaction 111 can modify the content of database 102. Transaction results 112 can be associated with timestamp 163 indicating the time transaction 111 was committed.

Method 200 includes generating checkpoint data for the transaction from the results of the transaction, the checkpoint data including versions of one or more inserted portions of data inserted into the in-memory database and including identifiers for one or more deleted portions of data deleted from the in-memory database (202). For example, checkpoint management module 104 can generate checkpoint data 114 for transaction 111. Checkpoint data 114 includes insert data 116 and insert ID 117 for a row version inserted into database 102 by insert operation 181. Checkpoint data 114 also include deleted data ID 118 for a row version deleted from database 102 by delete operation 182.

In some embodiments, checkpoint management module 104 generates checkpoint data 114 by scanning transaction log 103 for transaction results 112 after they are logged. Scanning transaction log 103 can occur close in time to the logging of transaction results 112 to increase the likelihood of the transaction results 112 still being cached in memory. Scanning transaction log 103 can be performed without database 102 being loaded in memory. As such, generating checkpoint data 114 from transaction results 112 can be useful on secondary servers or when backups of transaction log 103 are restored.

In other embodiments, checkpoint management module 104 generates checkpoint data 114 from memory contents 113 as part of post processing after transaction 111 commits. Work for processing memory contents 113 into checkpoint data 114 can be spread across many threads.

Method 200 includes appending the checkpoint data to a checkpoint (203). For example, checkpoint data 114 can be appended to checkpoint 119. Checkpoint 119 can be stored in durable storage.

Appending checkpoint data to a checkpoint includes determining that the timestamp is within a specified timestamp range for a data file, the data file configured to store any inserted portions of data inserted into the in-memory database within the specified timestamp range (204). For example, file locator 161 can determine that timestamp 163 is with timestamp range 123B of data file 121B. Thus, data file 121B is configured to store an inserted portions of data (e.g., row versions) inserted into database 102 within timestamp range 123B.

Appending checkpoint data to a checkpoint includes appending the one or more inserted portions of data to the data file (205). For example, file updater 162 can append insert data 116 along with data ID 117 into data file 121B. Inserted data 128 and data IDs 129 can be stored in data file 121B from previous checkpoint updates. As depicted, delta file 122B includes deleted data IDs 118B. Deleted data IDs 118B indicate data (e.g., row versions) deleted within timestamp range 123B.

Appending checkpoint data to a checkpoint includes, for each of the one or more deleted portions of data, identifying a corresponding insert operation that inserted the deleted portion of data into the in-memory database (206). For example, file locator 161 can identify a prior insert operation that inserted the data (e.g., row version) into database 102 that was deleted by a delete operation 182. Appending checkpoint data to a checkpoint includes, for each of the one or more deleted portions of data, locating a timestamp for a transaction that included the corresponding insert operation (207). For example, file locator 161 can locate a time stamp for the transaction that included the prior insert operation.

Appending checkpoint data to a checkpoint includes, for each of the one or more deleted portions of data, determining that the located timestamp is within a second specified time range for a delta file (208). For example, file locator 161 can determine that the timestamp for the transaction that included the prior insert operation is within timestamp range 123A.

Appending checkpoint data to a checkpoint includes, for each of the one or more deleted portions of data, appending the identifier for the deleted portion of data to the delta file, the delta file configured to store identifiers for any deleted portions of data deleted from the in-memory database during the second specified time range (209). For example, file updater can append deleted data ID 118 into delta file 122A. Deleted data ID 118 can correspond to a data ID in data IDs 126 indicating that a portion of inserted data (e.g., a row version) in inserted data 124 was subsequently deleted for database 102. Deleted data IDs 127 can be stored in delta file 122A from previous checkpoint updates.

Figure 3:
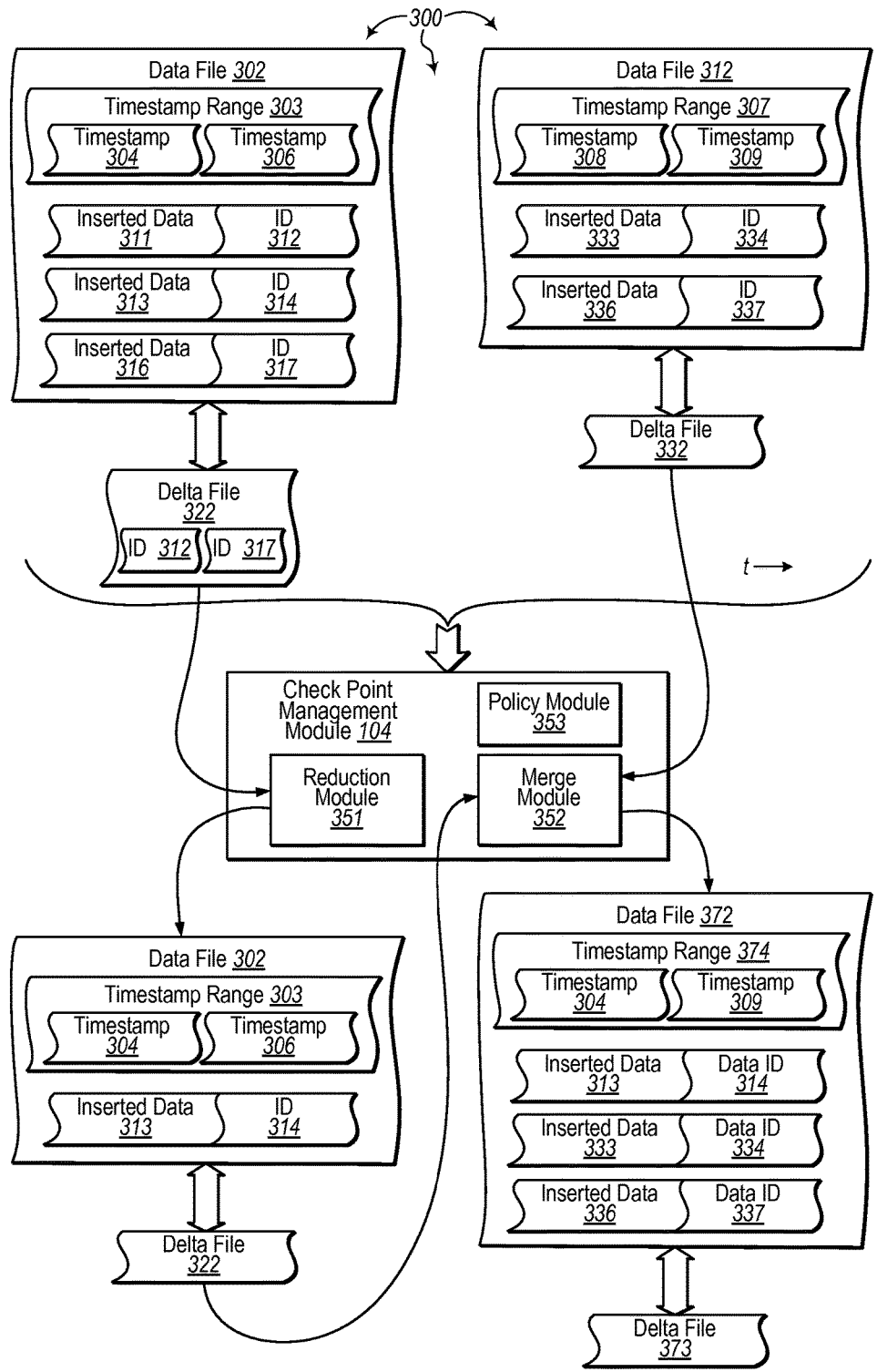
FIG. 3 illustrates an example computer architecture that facilitates managing the storage resources consumed by the checkpoint files.

FIG. 3 illustrates an example computer architecture 300 that facilitates managing the storage resources consumed by the checkpoint files. As depicted in computer architecture 300, checkpoint management module 104 further includes reduction module 351, merge module 352, and policy module 353.

The set of files associated with a checkpoint can grow as checkpoint data is accumulated. However, over time the utility of each data files degrades as more and more data (e.g., row versions) are marked deleted in corresponding delta files. As such, storage resources consumed by data files can be reduced in a number of ways. Reducing consumed storage resources can enhance performance of recovery and restoration processes.

In general, reduction module 351 is configured to collapse the contents of a data file. A data file can be collapsed by removing inserted portions of data from the data file. Removed portions of data can have identifiers that correspond to identifiers in a corresponding delta file. Since identifiers in a delta file represent data (e.g., row versions) that was subsequently deleted, there is little, if any, need to retain the data in a data file.

Merge module 352 is configured to merge the contents of two of more data files together. A merged data file can span the timestamp ranges of the two or more data files.

Policy module 353 is configured to activate storage resource reduction for data files in response to satisfying a policy condition. Policy conditions can include: exceeding a threshold percentage of deleted data, exceeding a threshold amount of deleted data, exceeding a percentage full for the storage resources, exceeding an expected recovery time value, etc. For example, when more than 50% of data in a data file is subsequently deleted data, the data file can be collapsed.

In some embodiments, data files are configured to have a fixed file size. Policy conditions can also include detecting multiple data files containing less data than the fixed file size. For example, when two or more temporally adjacent data files collectively contain an amount of data less than the fixed file size, the two or more data files can be merged.

In other embodiments, insert data can have longer lifetimes. Policy conditions can also include detecting when insert data has lived longer than a specified period of time. When insert data has lived longer than the specified period of time, it can be inferred that the insert data is highly unlikely to ever be deleted. As such, it may be unnecessary to store data files containing long lifetime data in an expanded format (since it is unlikely any deletes would ever be applied to the insert data for removal). Thus, data files containing insert data that has not been deleted within the specified time period can be compressed (using file compression techniques) to conserve storage resources. During recovery, compressed files can be uncompressed to access insert data contained in the data files.

Figure 4:
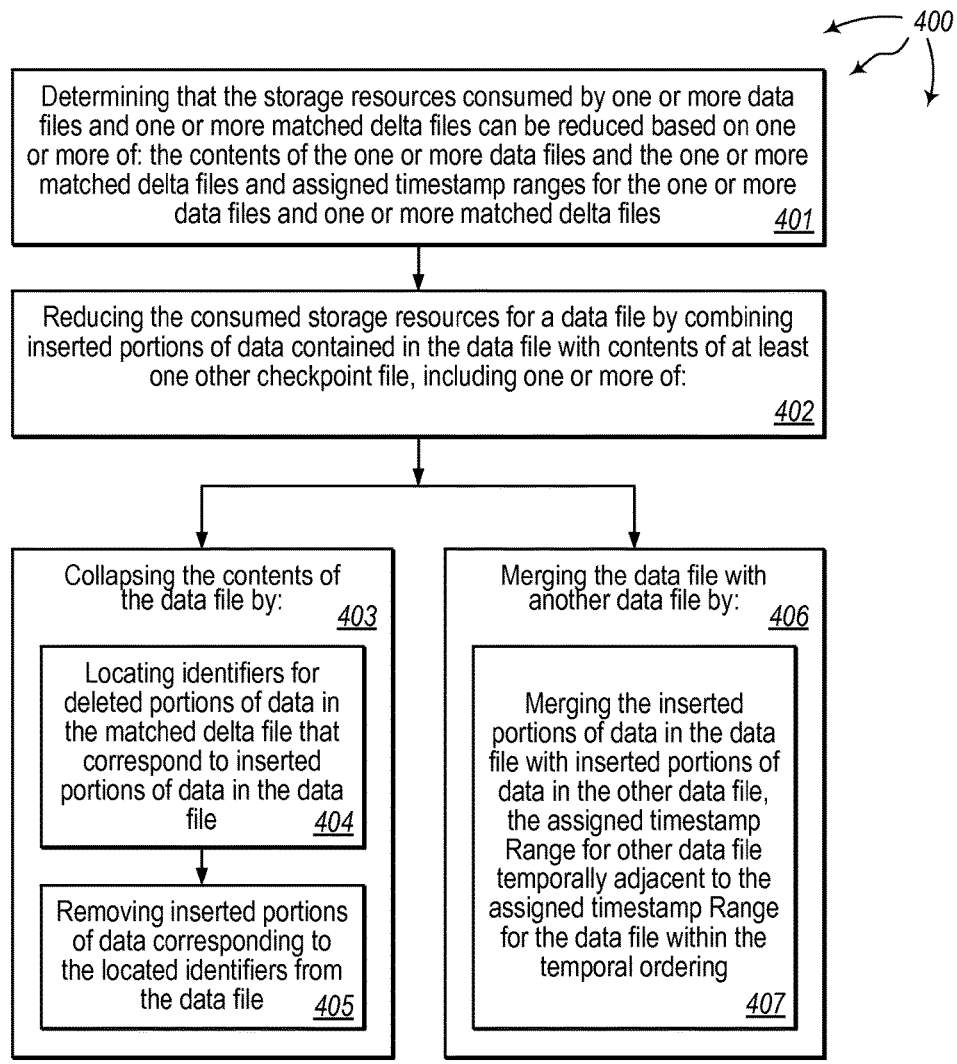
FIG. 4 illustrates a flow chart of an example method for managing the storage resources consumed by the checkpoint files.

FIG. 4 illustrates a flow chart of an example method 400 for managing the storage resources consumed by the checkpoint files. Method 400 will be described with respect to the components and data of computer architecture 300.

Method 400 includes determining that the storage resources consumed by one or more data files and one or more matched delta files can be reduced based on one or more of: the contents of the one or more data files and the one or more matched delta files and assigned timestamp ranges for the one or more data files and one or more matched delta files (401). For example, checkpoint management module 104 can determine that storage resources consumed by one or more of data files 302 and 312 and matching delta files 322 and 332 respectively can be reduced. The determination can be based on one or more of: inserted data 311, 313, 316 and corresponding IDs 312, 314, and 317 respectively in data file 302, IDs 312 and 317 in delta file 322, inserted data 333 and 336 and corresponding IDs 334 and 317 respectively in data file 312, and that delta file 332 is empty. Alternatively or in combination, the determination can be based on time stamp range 303 (i.e., from timestamp 304 to timestamp 306) and/or timestamp range 304 (i.e., from timestamp 308 to time stamp 309).

Method 200 includes reducing the consumed storage resources for a data file by combining inserted portions of data contained in the data file with contents of at least one other checkpoint file (402). For example, the consumed storage resources for data file 302 can be reduced by combining inserted data 311, 313, and 316 with the contents of one or more of: delta file 322 and data file 312.

Reducing the consumed storage resources for a data file can include one or more of collapsing the contents of the data file (403) and merging the data file with another data file (406). For example, inserted data 311, 313, and 316 from data file 302 can be collapsed. Alternately, or in combination, inserted data 311, 313, and 316 from data file 302 can be merged with inserted data 333 and 336 from data file 312.

Collapsing the contents of a data file includes locating identifiers for deleted portions of data in the matched delta file that correspond to inserted portions of data in the data file (404). For example, reduction module 351 can locate identifiers 312 and 317 in delta file 322 that correspond to inserted data 311 and 316 in data file 302 respectively. Collapsing the contents of a data file includes removing inserted portions of data corresponding to the located identifiers from the data file (405). For example, reduction module 351 can remove inserted data 311 and 317 from data file 302.

Merging the data file with another data file includes merging the inserted portions of data in the data file with inserted portions of data in the other data file, the assigned timestamp range for other data file temporally adjacent to the assigned timestamp range for the data file within the temporal ordering (407). For example, merge module 352 can merge inserted data 313 from data file 302 with inserted data 333 and 336 from data file 312 to form data file 372. Timestamp range 374 can go from timestamp 304 (the beginning time stamp for data file 302) to timestamp 309 (the ending time stamp for data file 312). Data file 372 can be associated with corresponding delta file 373.

Figure 5A:
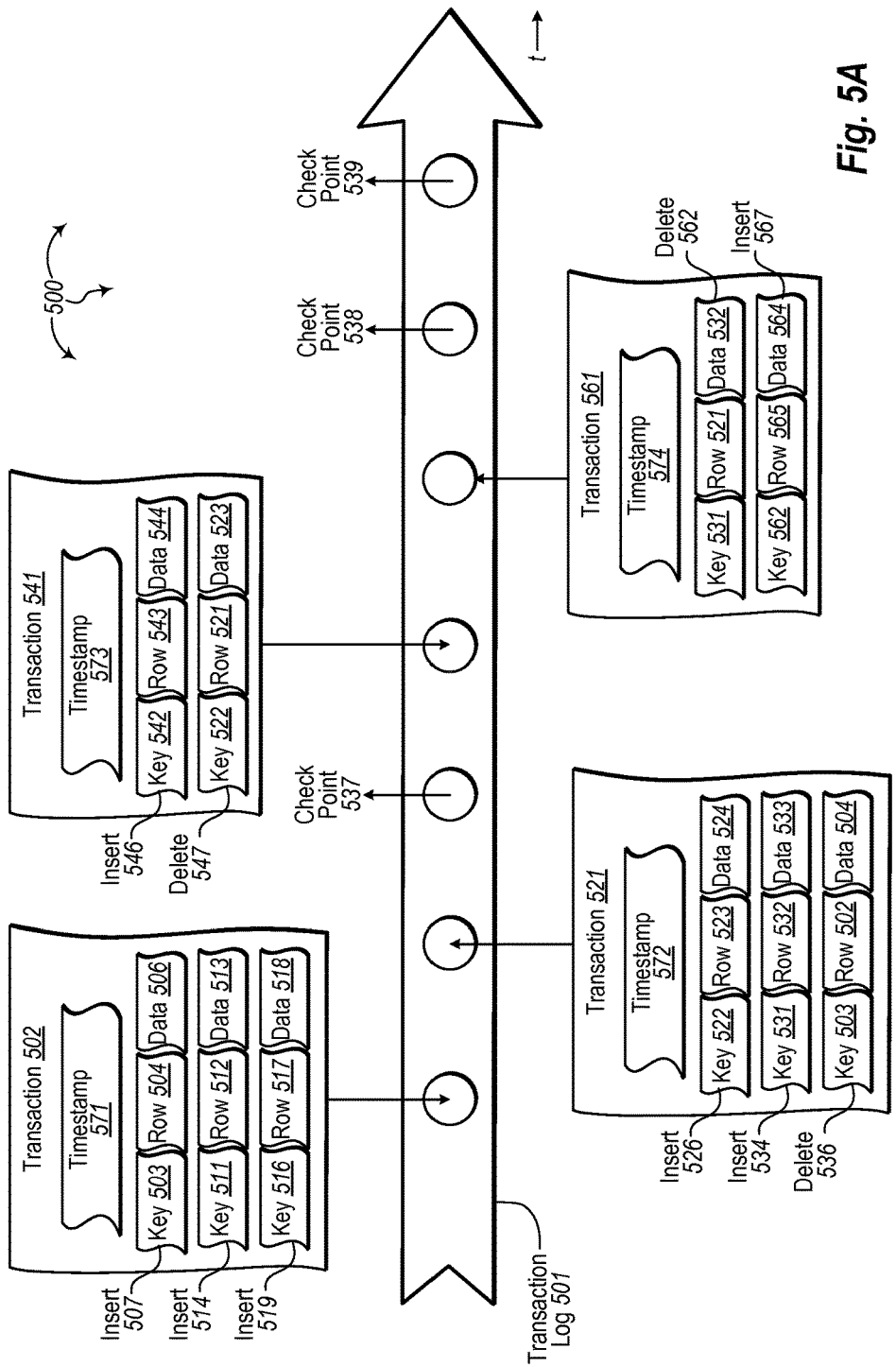
FIG. 5A illustrates an example transaction log after executing transactions and taking checkpoints.

FIG. 5A illustrates an example transaction 501 log after executing transactions 502, 521, 541, and 561 and taking checkpoints 537, 538, and 539.

Transaction 502 is logged in transaction log 501. Transaction 502 includes insert operations 507, 514, and 519. Insert 507 uses key 503 as the primary key for the record inserted, row 504 is a sequential number assigned to insert operation 507, and data 506 represents inserted data. Insert 514 uses key 511 as the primary key for the record inserted, row 512 is a sequential number assigned to insert operation 515, and data 513 represents inserted data. Insert 519 uses key 516 as the primary key for the record inserted, row 517 is a sequential number assigned to insert operation 519, and data 518 represents inserted data. Transaction 502 has timestamp 571.

Transaction 521 is then logged in transaction log 501. Transaction 521 includes insert operations 526 and 534 and delete operation 536. Insert 526 uses key 522 as the primary key for the record inserted, row 523 is a sequential number assigned to insert operation 526, and data 524 represents inserted data. Insert 534 uses key 531 as the primary key for the record inserted, row 532 is a sequential number assigned to insert operation 534, and data 533 represents inserted data. Delete 536 uses key 503 as the primary key the record deleted, transaction 502 indicates the transaction that previously inserted the data that is to be deleted, row 504 is the sequential number for insert operation 507.

Checkpoint 537 is taken after transaction 521 is logged.

Transaction 541 is then logged in transaction log 501. Transaction 541 includes insert operations 546 and delete operation 547. Insert 546 uses key 542 as the primary key for the record inserted, row 543 is a sequential number assigned to insert operation 546, and data 544 represents inserted data. Delete 546 uses key 503 as the primary key the record deleted, transaction 521 indicates the transaction that previously inserted the data that is to be deleted, row 523 is the sequential number for insert operation 526.

Transaction 561 is then logged in transaction log 501. Transaction 561 includes delete operation 562 and insert operation 567. Delete 562 uses key 531 as the primary key the record deleted, transaction 521 indicates the transaction that previously inserted the data that is to be deleted, row 532 is the sequential number for insert operation 534. Insert 567 uses key 562 as the primary key for the record inserted, row 563 is a sequential number assigned to insert operation 567, and data 564 represents inserted data.

Insert 519 uses key 516 as the primary key for the record inserted, row 517 is a sequential number assigned to insert operation 519, and data 518 represents inserted data. Transaction 502 has timestamp 571.

Checkpoint 538 is taken after transaction 521 is logged.

Checkpoint 539 is taken after checkpoint 538.

Figure 5B:
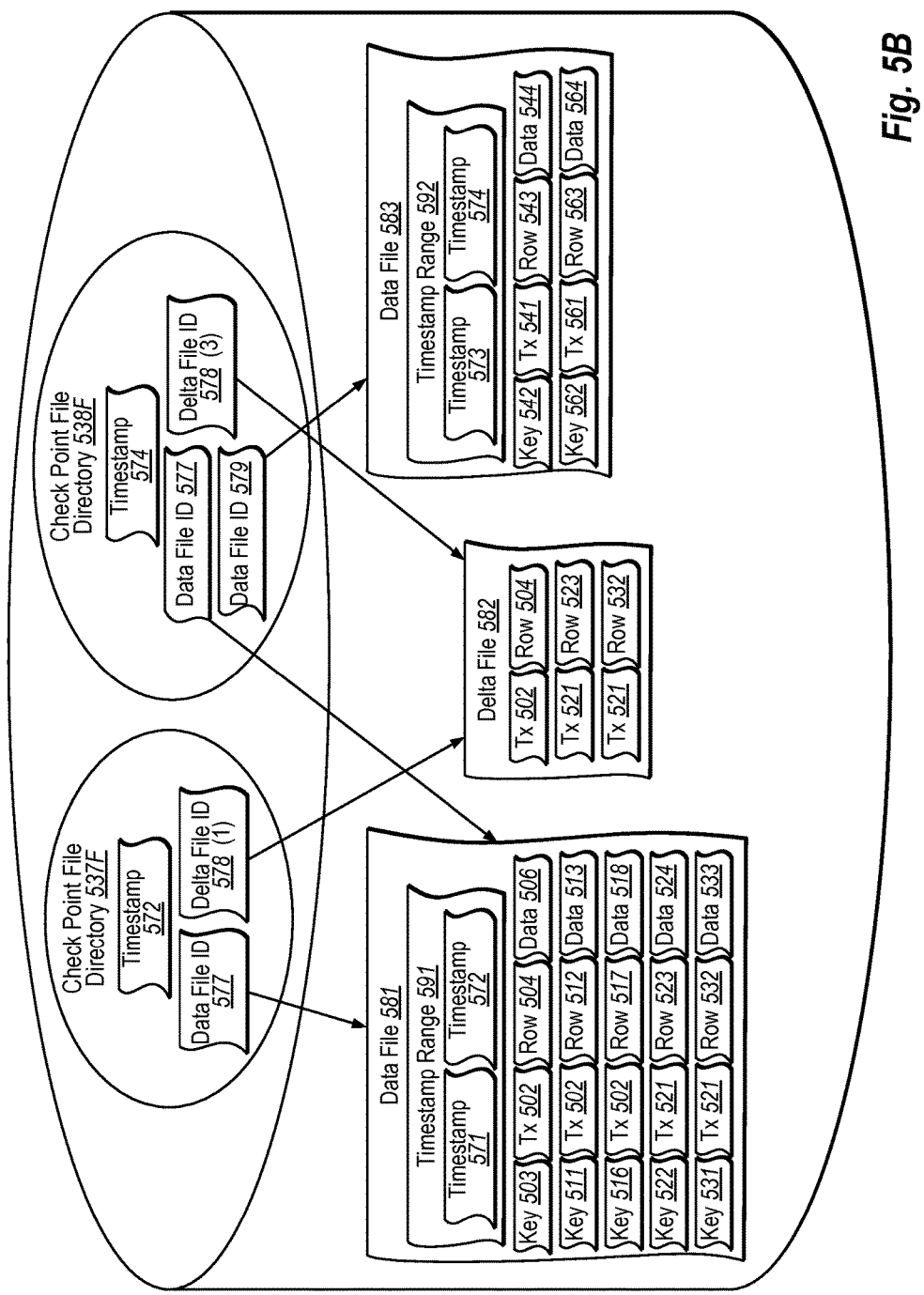
FIG. 5B illustrates the contents of two example checkpoints based on the transaction log from FIG. 5A.

FIG. 5B illustrates the contents of two example checkpoints based on the transaction log 501. In general, checkpoint data can be pulled from transaction log 501 for inclusion in the depicted checkpoint data files.

Checkpoint 537 includes checkpoint file directory 537F. Checkpoint file directory 537F includes timestamp 572 (indicating the latest time included checkpoint 537). Checkpoint file directory 537F also includes data file ID 577 identifying data file 581. Checkpoint file directory 537F also includes delta file ID 578 and delta file index (1). Delta file ID 578 identifies delta file 582. Index (1) indicates that the first entry in delta file 582 corresponds to checkpoint 537. The location of checkpoint directory file 537F can be stored in durable storage.

Data file 581 includes timestamp range 591, ranging from timestamp 571 to timestamp 572. Data file 581 also includes an entry for each insert operation in transaction 502 and transaction 521. Each entry links a key, transaction, row, and data together. For example, one entry in data file 581 links key 503, transaction 502, row 504, and data 506.

Checkpoint 538 includes checkpoint file directory 538F. Checkpoint file directory 538F includes timestamp 574 (indicating the latest time included checkpoint 538). Checkpoint file directory 538F also includes data file IDs 577 and 579 identifying data files 581 and 583 respectively. Checkpoint file directory 538F also includes delta file ID 578 and delta file index (3). Delta file ID 578 identifies delta file 582. Index (3) indicates that entries after those corresponding to the immediately early checkpoint up through the third entry in delta file 582 (or entries 2 and 3) correspond to checkpoint 538. The location of checkpoint directory file 538F can be stored in durable storage.

Data file 583 includes timestamp range 592, ranging from timestamp 573 to timestamp 574. Data file 583 also includes an entry for each insert operation in transaction 541 and transaction 561. Each entry links a key, transaction, row, and data together. For example, one entry in data file 581 links key 542, transaction 541, row 543, and data 544.

Delta file 582 includes entries identifying transactions and rows that have been deleted. For example, delta file 582 includes an entry indicating that row 504 from transaction 502 was deleted.

Figure 5C:
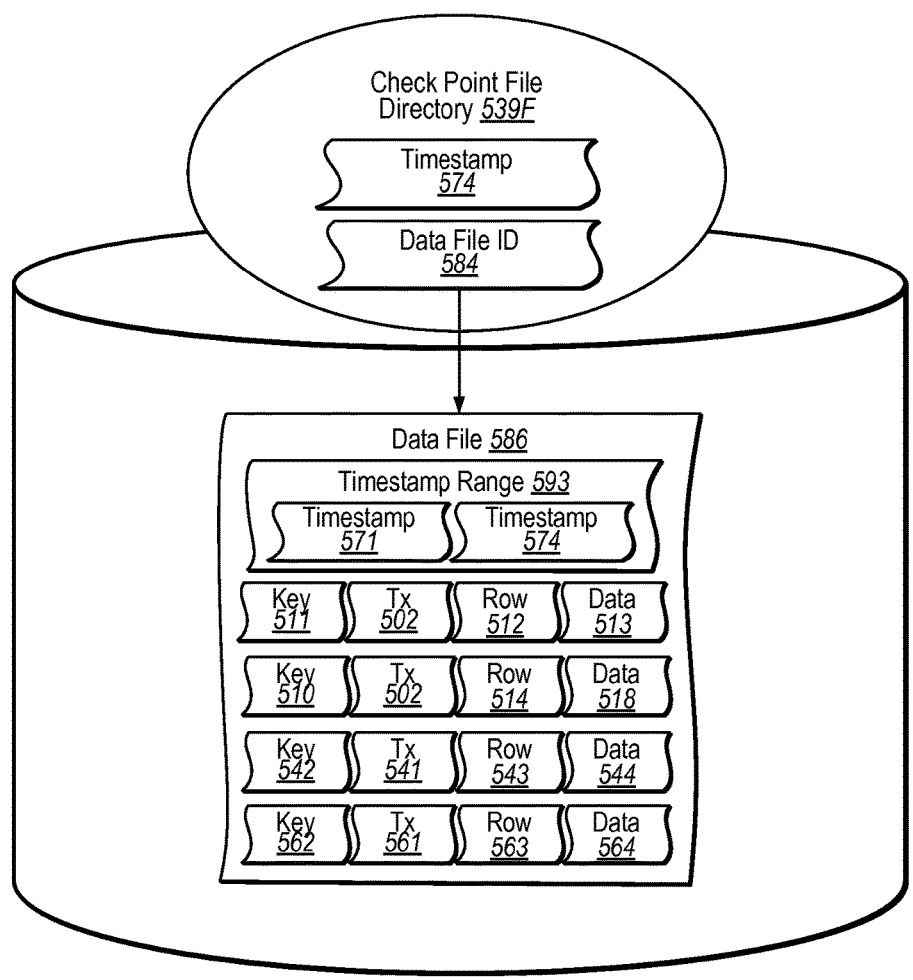
FIG. 5C illustrates an example of merge processing on two example checkpoints from FIG. 5B.

FIG. 5C illustrates an example of merge processing on two example checkpoints 537 and 538 to form checkpoint 539. Checkpoint 539 includes checkpoint file directory 539F. Checkpoint file directory 539F includes timestamp 574 (indicating the latest time included checkpoint 539). Checkpoint file directory 539F also includes data file ID 584 identifying data file 586.

In addition to freeing up storage resources, reducing consumed storage resources also increases the efficiency of recovery procedures since there is less deleted data to scan and filter out when reloading system memory.

Figure 6:
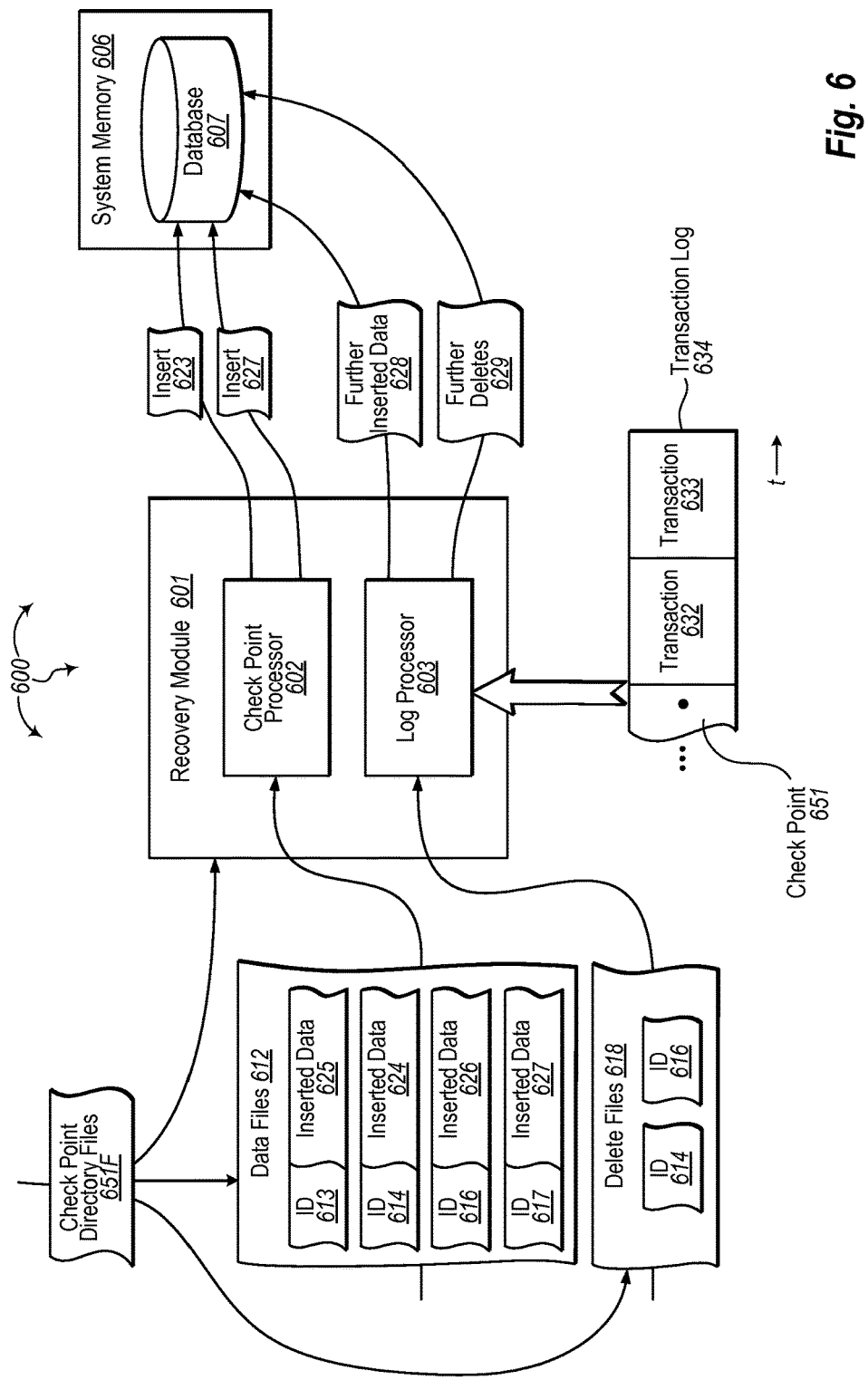
FIG. 6 illustrates an example computer architecture that facilitates reestablishing a state of in-memory data that reflects a most recently committed transaction.

FIG. 6 illustrates an example computer architecture 600 that facilitates reestablishing a state of in-memory data that reflects a most recently committed transaction. Referring to FIG. 6, computer architecture 600 includes recovery module 601 and system memory 606. Recovery module 601 and system memory 606 can be connected to one another over (or be part of) a system bus and/or a network, such as, for example, a Local Area Network ("LAN"), a Wide Area Network ("WAN"), and even the Internet. Accordingly, recovery module 601 and system memory 606, as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, system memory 606 includes in-memory database 607. In some embodiments, in-memory database 607 is a relational database. Transaction log 634 is configured to store log records indicating the effects of committed transactions inserting and deleting row versions for in-memory database 607. A log record can contain information about data (e.g., row versions) inserted and deleted by a transaction, sufficient to redo them. Transaction log 634 can be stored in durable storage. Thus, users or other computer systems can submit transactions on data (e.g., row versions) stored in database 607. The results of completed transactions can be then be logged in transaction log 634.

Recovery module 601 includes checkpoint processor 602 and log processor 603. During a recovery process, recovery module 601 can access the location of a checkpoint directly file from durable storage. Recovery module 601 can then refer to the checkpoint directory file to obtain the locations for any data files and any delta files for a checkpoint. Checkpoint processor 602 can process the data files and delta files to insert appropriate data (e.g., row versions) into database 607. Subsequently, to complete the recovery process, log processor 603 can process any log data past the timestamp of the latest checkpoint (i.e., any transactions that were not checkpointed). Log processor 602 can replay transactions to insert and delete data from database 607.

Figure 7:
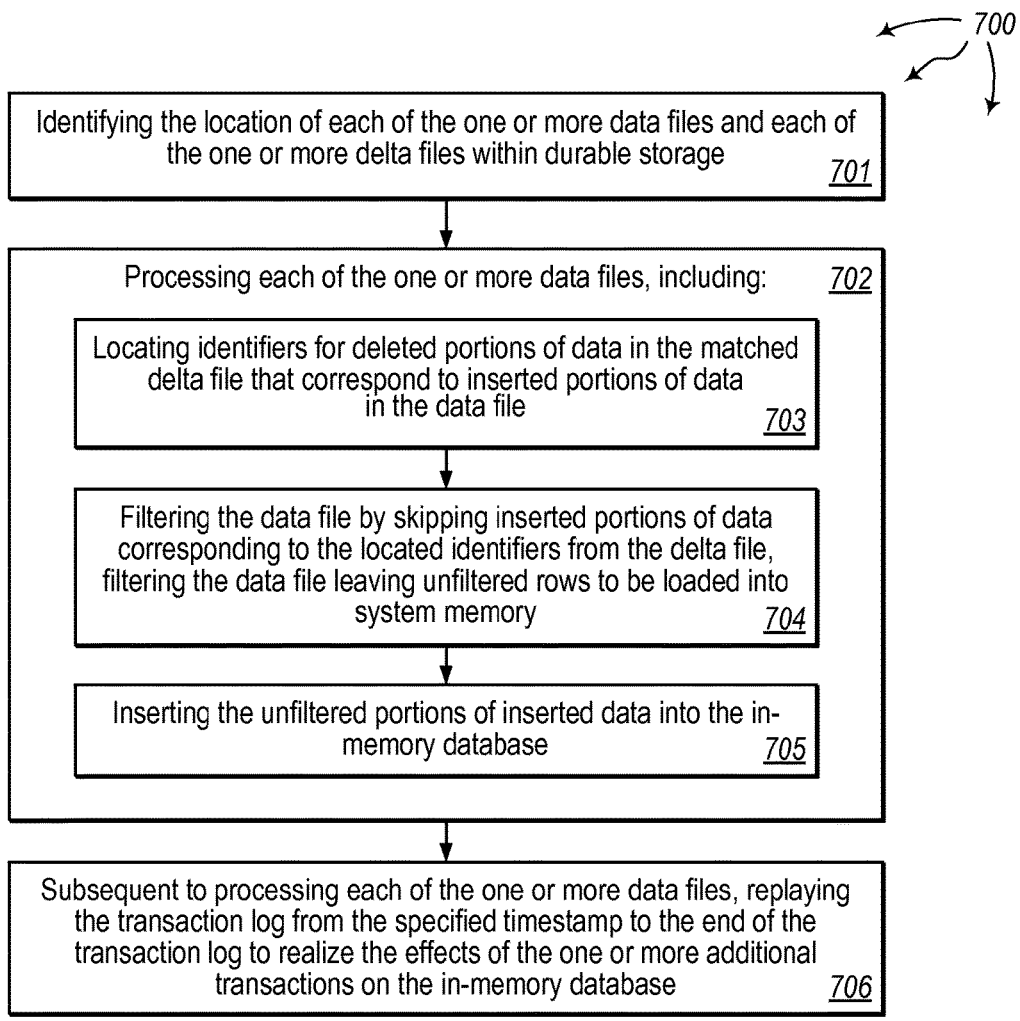
FIG. 7 illustrates a flow chart of an example method for reestablishing a state of in-memory data that reflects a most recently committed transaction.

FIG. 7 illustrates a flow chart of an example method 600 for reestablishing a state of in-memory data that reflects a most recently committed transaction. Method 700 will be described with respect to the components and data of computer architecture 600.

Method 700 includes identifying the location of each of the one or more data files and each of the one or more delta files within durable storage (701). For example, recovery module 601 can access the location of checkpoint directory file 651F from durable storage. Recovery module 601 can refer to checkpoint directory file 651F obtain file IDs for data files 612 and delta files 618 (i.e., the data and delta files for checkpoint 651).

Method 700 includes processing each of the one or more data files (702). For example, checkpoint processor 602 can process data files 612. Data files 612 include IDs and corresponding inserted data, including: ID 613 and inserted data 623, ID 614 and inserted data 624, ID 616 and inserted data 626, and ID 617 and inserted data 627.

Processing each of the one or more data files includes locating identifiers for deleted portions of data in the matched delta file that correspond to inserted portions of data in the data file (703). For example, checkpoint processor 602 can identify IDs 614 and 616 in delta files 618. IDs 614 and 616 correspond to inserted data 624 and 626 in data files 612. Processing each of the one or more data files includes filtering the data file by skipping inserted portions of data corresponding to the located identifiers from the delta file, filtering the data file leaving unfiltered rows to be loaded into system memory (704). For example, checkpoint processor 602 can filter data files 612 by skipping inserted data 624 and 626 corresponding to IDs 614 and 616 respectively. Filtering data files 612 leaves inserted data 623 and 627 remaining for insertion into database 607. Method 700 includes inserting the unfiltered portions of inserted data into the in-memory database (706). For example, checkpoint processor 602 can insert inserted data 623 and 627 into database 607.

Method 700 includes subsequent to processing each of the one or more data files, replaying the transaction log from the specified timestamp to the end of the transaction log to realize the effects of the one or more additional transactions on the in-memory database (706). For example, log process 603 can replay transaction log 634 after checkpoint 651. Replaying transaction log 623 realizes the effects of transactions 632 and 633 in database 607. For example, log processor 603 can insert further inserted data 629 into database 627. Log processor 603 can also implement further deletes 620 to remove data from database 607.

Accordingly, the combined content of a log and one or more checkpoints are sufficient to recover an in-memory database to a transactionally consistent point in time. In some embodiments, recovery checkpoint files are loaded and processed and processed in parallel. For example, other data and delta files, in addition to data files 612 and delta files 618, can be loaded and processed in parallel with data files 612 and delta files 618.

Embodiments of the invention allow for considerable flexibility in managing storage and performance. Files can include a checksum to detect storage errors and can be encrypted. Multiple copies of checkpoint files can be retained to support recovery when a checkpoint file gets damaged. Data files can allocated in fixed sizes and reused after merge operations for later checkpoints. The threshold for merge operations can be driven by recovery time requirements and the need to reduce storage space consumption with a tradeoff being the CPU and I/O costs to perform the merge. Merge operations can be done alongside and in parallel with other checkpoint operations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer-implemented method comprising:
   generating checkpoint data from results of a transaction, the results of the transaction modifying contents of an in-memory database, the checkpoint data including an inserted portion of data inserted into the in-memory database as a first result of the transaction and including an identifier identifying a deleted portion of data deleted from the in-memory database as a second result of the transaction;
   accessing a checkpoint directory file that references a data file included in a checkpoint for the in-memory database and that references a delta file included in the checkpoint, wherein the referenced data file stores any inserted portions of data inserted into the in-memory database within a specified timestamp range, and wherein the referenced delta file stores identifiers for any deleted portions of data deleted from the in-memory database during another specified timestamp range;
   appending the checkpoint data to the checkpoint, including:
      accessing a timestamp associated with the transaction, the timestamp indicating an associated time the transaction was committed relative to other transactions;
      determining that the timestamp is within the specified timestamp range;
      appending the inserted portion of data to the referenced data file;
      matching the deleted portion of data to a corresponding insert operation that inserted the deleted portion of data into the in-memory database;
      accessing another timestamp associated with another transaction that included the corresponding insert operation; determining the another timestamp is within the another specified timestamp range; and appending the identifier identifying the deleted portion of data to the referenced delta file.

2. The method of claim 1, wherein generating the checkpoint data further comprises accessing the results of the transaction from a transaction log, the results of the transaction being stored in the transaction log, the transaction log stored in durable storage.

3. The method of claim 1, wherein appending the inserted portion of data to the data file comprises using sequential I/O to write the inserted portion of data to the data file.

4. The method of claim 1, further comprising:
   closing an existing data file at a particular time; and
   creating a new data file and a new corresponding delta file for the checkpoint, the new data file and new corresponding delta file having a time stamp starting immediately after the closed existing data file.

5. The method of claim 4, further comprising updating the checkpoint directory file with a location of the new data file.

6. The method of claim 5, further comprising storing a location of the checkpoint directory file in a durable storage location available at recovery time.

7. The method of claim 4, further comprising collapsing contents of the existing data file.

8. The method of claim 1, further comprising using the identifier to collapse contents of another referenced data file.

9. The method of claim 8, wherein using the identifier to collapse the contents of the another referenced data file comprises using the identifier to remove inserted portions of data corresponding to the identifier from the another referenced data file.

10. A computer-implemented method, comprising:
    reducing consumed storage resources for a plurality of checkpoints for an in-memory database by:
    (a) collapsing contents of a checkpoint data file included in one of the plurality of checkpoints, the checkpoint data file referenced from a checkpoint file directory, the checkpoint data file including inserted portions of data inserted into the in-memory database within a specified timestamp range, the collapsing including:
       locating an identifier associated with a deleted portion of data in a checkpoint delta file included in the one of the plurality of checkpoints, the checkpoint delta file referenced from the checkpoint file directory, the checkpoint delta file including identifiers for deleted portions of data deleted from the in-memory database during a second specified timestamp range, the identifier corresponding to an inserted portion of data in the checkpoint data file; and
       removing the inserted portion of data from the checkpoint data file corresponding to the identifier in the checkpoint delta file; and
    (b) merging an additional checkpoint data file included in a second one of the plurality of checkpoints, the additional checkpoint data file referenced from another checkpoint file directory file with a further checkpoint data file included in a separate one of the plurality of checkpoints, the further checkpoint data file referenced from a further checkpoint file directory, the further checkpoint data file having an assigned timestamp range temporally adjacent to an additional assigned timestamp range of the additional checkpoint data file, including:
  merging the inserted portions of data in the additional checkpoint data file with inserted portions of data in the further checkpoint data file.

11. The method of claim 10, wherein merging the additional checkpoint data file with the further checkpoint data file comprises forming a new combined data file that includes both the inserted portions of data in the additional checkpoint data file and the inserted portions of data in the further checkpoint data file.

12. The method of claim 10, wherein collapsing the contents of a checkpoint data file further includes:
  identifying a matched checkpoint delta file corresponding to the checkpoint data file; and
  removing the located identifier from the matched checkpoint delta file.

13. The method of claim 10, wherein reducing the consumed storage resources further comprises:
  identifying a matched checkpoint delta file corresponding to the additional checkpoint data file;
  identifying another matched checkpoint delta file corresponding to the further checkpoint data file; and
  merging identifiers in the matched checkpoint delta file with identifiers in the another matched checkpoint delta file.

14. The method of claim 10, further comprising merging the checkpoint data file with another checkpoint data file.

15. The method of claim 10, wherein reducing the consumed storage resources comprises reducing the consumed storage resources in accordance with a policy condition.

16. The method of claim 15, wherein reducing the consumed storage resources in accordance with the policy condition comprises reducing the consumed storage resources in accordance with the policy condition selected from among: exceeding a threshold percentage of deleted data, exceeding a threshold amount of deleted data, exceeding a percentage full for the consumed storage resources, and exceeding an expected recovery time value.

17. A computer-implemented method for reestablishing a state for an in-memory database, the method being implemented by a computer system including one or more processors and durable storage, the method comprising:
  for each of one or more data files and one or more delta files, the one or more data files including inserted portions of data inserted into the in-memory database within a specified timestamp range by one or more transactions and the one or more delta files including identifiers for deleted portions of data deleted from the in-memory database during a second specified timestamp range by the one or more transactions:
    identifying a location of each of the one or more data files and a location of each of the one or more delta files within the durable storage using a checkpoint file directory, a location of the checkpoint file directory stored in the durable storage;
    processing each of the one or more data files, including:
      locating identifiers for deleted portions of data in one of the one or more delta files that correspond to inserted portions of data in the data file being processed;
      filtering the data file being processed by skipping inserted portions of data corresponding to the located identifiers from the one of the one or more delta files; and
      inserting unfiltered inserted portions of data into the in-memory database; and
    subsequent to processing each of the one or more data files, replaying a transaction log from a specified timestamp to an end of the transaction log to realize effects of one or more additional transactions on the in-memory database, the one or more additional transactions not being included in the one or more data files or the one or more delta files.

18. The method of claim 17, wherein processing each of the one or more data files comprises processing a plurality of data files in parallel.

19. The method of claim 17, wherein identifying the location of each of the one or more data files and the location of each of the one or more delta files comprises referring to a checkpoint directory file to identify the location of each of the one or more data files and each of the one or more delta files.

20. The method of claim 17, wherein replaying at transaction log comprises reestablishing the state of the in-memory database to that of a most recently committed transaction.

* * * * *